United States Patent [19]

Dangschat

[11] 4,377,036
[45] Mar. 22, 1983

[54] PRECISION MEASURING APPARATUS HAVING A MEASURING INTERVAL SEALED FROM ENVIRONMENTAL INFLUENCES

[75] Inventor: Holmer Dangschat, Traunwalchen, Fed. Rep. of Germany

[73] Assignee: Dr. Johannes Heidenhain GmbH, Traunreut, Fed. Rep. of Germany

[21] Appl. No.: 234,489

[22] Filed: Feb. 17, 1981

[30] Foreign Application Priority Data

Feb. 21, 1980 [DE] Fed. Rep. of Germany ....... 3006489

[51] Int. Cl.³ .................... G01B 9/02; G01B 11/02
[52] U.S. Cl. .......................... 33/125 A; 33/DIG. 2; 33/DIG. 4; 308/3.5; 308/5 R; 356/358
[58] Field of Search ............. 33/125 R, 125 A, 125 C, 33/125 W, 143 L, 147 N, 172 E, DIG. 2, DIG. 4; 356/356, 358; 308/3.5, 5 R, DIG. 1

[56] References Cited

U.S. PATENT DOCUMENTS

| | | | |
|---|---|---|---|
| 3,355,990 | 12/1967 | Thum | 308/3.5 |
| 3,393,648 | 7/1968 | Diehr | 33/DIG. 2 |
| 3,582,211 | 6/1971 | McClure et al. | 33/125 A |
| 4,080,009 | 3/1978 | Marathe et al. | 308/5 R |
| 4,160,328 | 7/1979 | Ernst | 33/125 C |
| 4,295,742 | 10/1981 | Nelle et al. | 33/125 C |

FOREIGN PATENT DOCUMENTS

| | | | |
|---|---|---|---|
| 1149591 | 5/1963 | Fed. Rep. of Germany | 308/5 R |
| 1548871 | 9/1969 | Fed. Rep. of Germany | 33/125 C |
| 2113477 | 10/1971 | Fed. Rep. of Germany | |
| 2421371 | 11/1975 | Fed. Rep. of Germany | |
| 2460406 | 11/1977 | Fed. Rep. of Germany | |
| 2908045 | 9/1980 | Fed. Rep. of Germany | |
| 1601631 | 10/1970 | France | 33/125 C |

Primary Examiner—Richard R. Stearns
Attorney, Agent, or Firm—Hume, Clement, Brinks, Willian & Olds, Ltd.

[57] ABSTRACT a precision measuring apparatus (0) defining a measuring interval sealed from environmental influences comprises a shielding housing (10) surrounding a measuring interval and defining within the housing wall a slit (10a) oriented along the measuring interval, a movable member (11) attachable to a measured object and movable along the measuring interval, a carrying member (1a) attached to the movable member (11) and extending through the slit (10a), fluid bearings (12b) interposed between the movable member and the shielding housing to form a bearing gap (12) therebetween and to movably support the movable member (11) on the shielding housing (10) substantially without friction, and sealing fluid (14c) positioned in the bearing gap (12) to seal the slit (10a). The apparatus further includes a fluid supply means (14) for supplying sealing fluid (14c) such as vacuum oil, to the bearing gap (12), and means (18) for evacuating the shielding housing (10). A channel (13b) for distributing the sealing fluid (14c) from the supply means (14) through the bearing gap (12) is defined by the movable member (11). Channels (13a, 13c) for collecting sealing fluid (14c) in the bearing gap (12) are defined by the wall of the housing (10). The fluid bearings (12b) can be pneumatic, formed by injecting compressed air into the bearing gap (12).

13 Claims, 3 Drawing Figures

PRECISION MEASURING APPARATUS HAVING A MEASURING INTERVAL SEALED FROM ENVIRONMENTAL INFLUENCES

BACKGROUND OF THE INVENTION

This invention relates to an improved precision measuring apparatus which defines a measuring interval sealed from environmental influences.

The term "measuring interval" is used herein to denote a segment of space in which a measurement determining or reading element of a measuring apparatus can move.

Measuring instruments having a member movable along a measuring interval are well known in the art. Among such instruments can be counted a laser interferometer having a movable reflector, and an instrument for determining the deviation of the path of a movable member from a straight line defined by a laser beam. Such an instrument can also take the form of a graduating machine for producing measuring grids having fine division fields. The instrument can also be a digital length-measuring apparatus in which the scale and the scanning unit are shielded against environmental influences. The shielding of the measuring interval assures that environmental influences on measurement will remain substantially unvarying.

West German OS No. 21 13 477 discloses a laser interferometer having the measuring interval enclosed in a shielding evacuated housing. The housing has a slit for the admission of a carrying member which carries the optical reflector. The slit is sealed by means of flexible sealing lips. The disadvantage of this arrangement is that the vacuum in the housing can be maintained only by continuous evacuation requiring relatively high capacity vacuum pumps.

To maintain a vacuum inside the housing, West German PS No. 24 21 371 proposes to close the slit in the shielding housing of an interferometer by means of a pair of flexible sealing lips which extend across the slit, one lip from each side of the slit, and which contact each other over the slit along the length of the slit to form a "roof" over the slit. The space around the sealing lips is filled with vacuum oil. In this arrangement only the relatively viscous oil can attempt to leak through whatever small leaks may exist in the sealing lips, making the housing more nearly airtight. When used in conjunction with the interferometer disclosed in OS No. 21 13 477, this liquid sealing arrangement has the advantage that evacuation of the housing need be repeated less often and consequently can be accomplished with vacuum pumps having a relatively lower capacity. However, this apparatus requires the addition of an oil pump for pumping the oil which leaks into the housing from the housing back to the sealing lips.

As an alternative way of sealing gaps in the housing sealing elements, West German PS No. 24 60 406 teaches sealing the gaps with a magnetic fluid and holding the fluid in place by means of a magnetic field.

However, in high-precision measuring instruments, such as the laser interferometer discussed above, problems arise due to the friction between the sealing elements and the carrying member which must pass through them. The carrying member transmits deformations caused by the friction to the measuring reflector, and this can result in measurement error. Since measurements may be in the range of the wavelength of light, even slight forces exerted on the carrying member can influence the measurements.

SUMMARY OF THE INVENTION

The present invention is directed to an improved precision measuring apparatus which defines a measuring interval sealed from environmental influences which is less subject to the above-mentioned disadvantages of the prior art. In particular, the invention is directed to a high precision measuring apparatus in which measurements are made substantially free of external influences such as changes in air pressure, temperature, humidity, air carbon dioxide content, and frictional forces.

According to this invention, a precision measuring apparatus defining a measuring interval sealed from environmental influences comprises a shielding housing surrounding a measuring interval and defining within the housing wall a sealed slit oriented along the measuring interval, a movable member attachable to a measured object and movable along the measuring interval, a carrying member attached to the movable member and extending through the slit, fluid bearings interposed between the movable member and the shielding housing to form a bearing gap therebetween and to movably support the movable member on the shielding housing substantially without friction, and sealing fluid positioned in the bearing gap to seal the slit.

Preferably, the apparatus further includes a fluid supply means for supplying sealing fluid, such as vacuum oil, to the bearing gap, and means for evacuating the shielding housing. A channel for distributing the sealing fluid from the supply means through the bearing gap is preferably defined by the movable member. Most preferably, channels for collecting sealing fluid in the bearing gap are defined by the housing wall. The fluid bearings are preferably pneumatic, formed by injecting compressed gas, such as air, into the bearing gap.

One important advantage of the present invention is that the effects of external influences, especially frictional forces on measurement, are substantially eliminated and consequently measurement need not be corrected for error induced by such influences.

Other objects and advantages of the invention will become apparent during the following description of the presently preferred embodiment of the invention.

DETAILED DESCRIPTION OF THE PREFERRED EMBODIMENT

Figure 1:
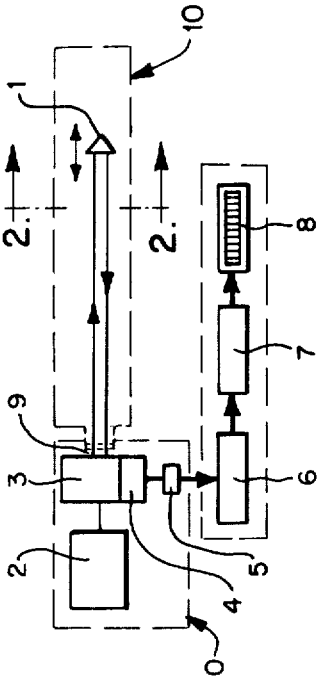
FIG. 1 is a schematic representation of a laser interferometer incorporating a preferred embodiment of the present invention.

Referring to the drawings, FIG. 1 shows a schematic view of a laser interferometer 0 which, in interaction with a movable reflector 1, is used for length measuring purposes.

A laser light source 2 provides a beam of light which is split by an interferometer optical system 3 into a measuring beam and a reference beam. The measuring beam passes through a window 9 into an evacuated shielding housing 10, inside of which is located the reflector 1. The measuring beam strikes the reflector 1 and is reflected back. Photodetector assembly 4 transduces received optical signals into electrical signals, which signals then pass through an amplifier and trigger unit 5 to control an up-down counter 6. The counter 6 counts the signals which are representative of the displacement of the reflector 1. A computer 7 converts the measured displacement of reflector 1 into decimal values which are then displayed on a display device 8.

Details of such interferometer operation are known to those skilled in the art and are not of primary concern here. Therefore they will not be explained in detail here.

Figure 2:
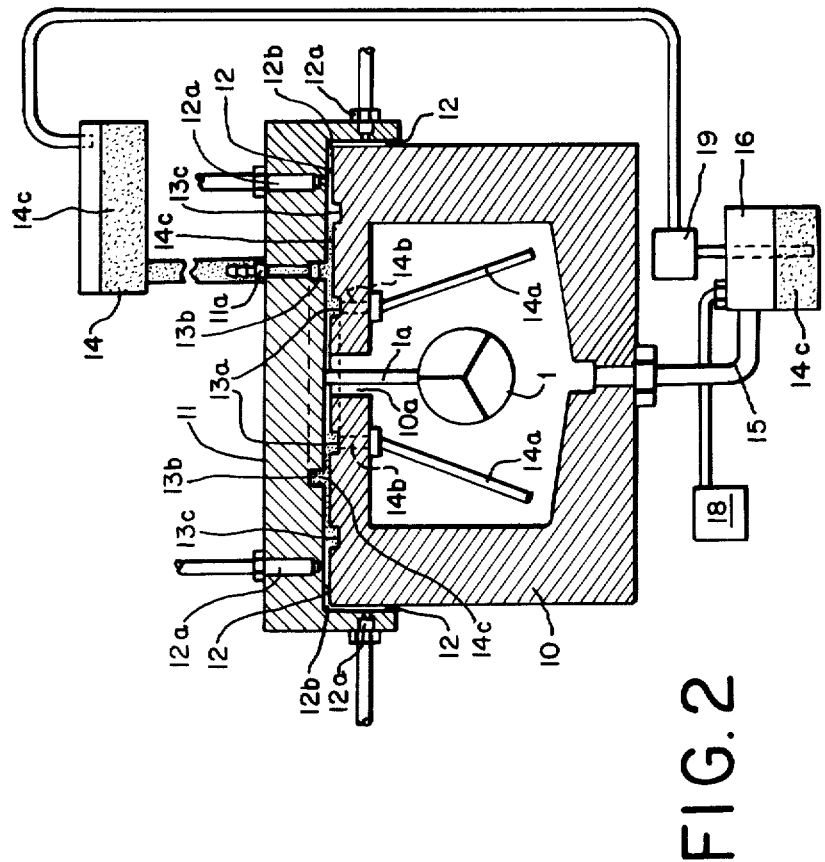
FIG. 2 is a sectional view of the interferometer of FIG. 1 taken along line 2—2 of FIG. 1.

FIG. 2 is a sectional view of the interferometer of FIG. 1 along the shielding housing 10. It shows the principle of how substantially friction-free movability of the reflector 1 with respect to the evacuated shielding housing 10 is achieved.

The reflector 1 is rigidly mounted to a carrier member 1a inside the housing 10. The carrier member 1a extends out through a slit 10a in the wall of the housing 10 and is rigidly mounted to a movable member or slide piece 11.

Figure 3:
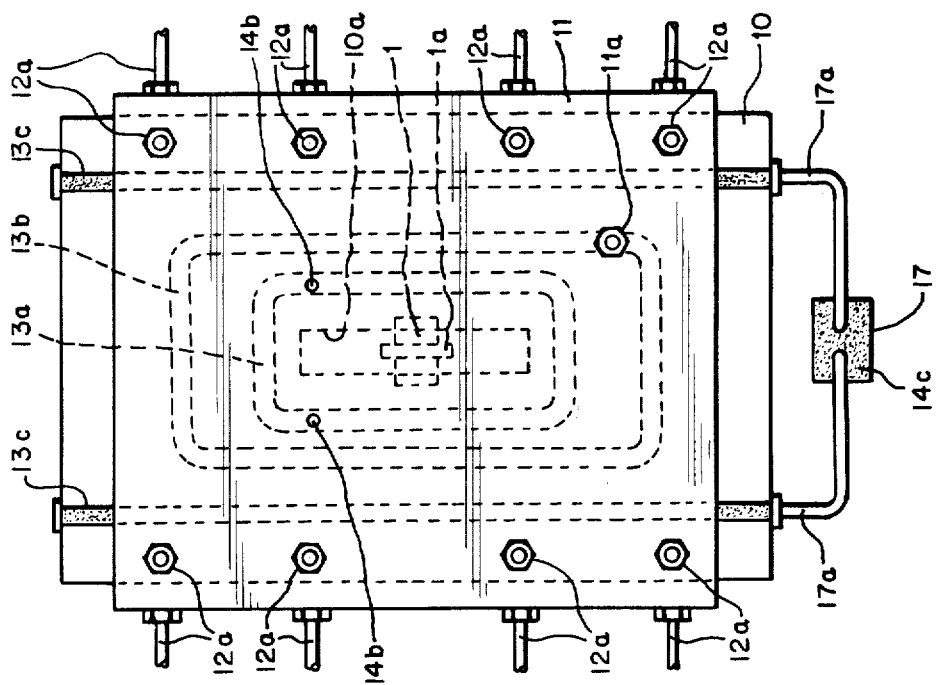
FIG. 3 is a plan view of the movable member and shielding housing wall of the interferometer of FIG. 2.

The slide piece 11 has a plurality of nozzles 12a defined therein, which nozzles 12a are symmetrically arranged, as shown in FIG. 3. The nozzles 12a are connected to a compressed air source (not shown) in a known manner. Through the nozzles 12a the compressed air source feeds compressed air between the slide piece 11 and the wall of the housing 10. The compressed air slightly lifts the slide piece 11 from the wall of the housing 10. The air gap 12 which is thus created between the slide piece 11 and the wall of the housing 10 is about 10 microns wide in this preferred embodiment, and acts as a bearing gap. The air bearing 12b which is thus created allows the slide piece 11, along with the attached carrying member 1a and the reflector 1, to slide essentially without friction on the surface of the housing 10.

However, to obtain accurate measurements with the interferometer 0, the motion of the reflector 1 must not only be frictionless but also the interior of the housing 10 must be free of harmful environmental influences, such as fluctuations in air pressure, temperature, moisture, and air carbon dioxide content, and therefore the housing 10 must be evacuated. The combined requirements of friction-free air bearings of the slide piece 11 and the vacuum conditions of the housing 10 present very problematic sealing conditions at the slit 10a. These conditions are further aggravated by the requirement that the carrying member 1a should preferably not be contacted, and thereby frictionally influenced, by seals, such as sealing lips.

In order to meet these difficult requirements, the seal is achieved in the following manner. The slit 10a is surrounded by an inner annular channel 13a formed in the outer wall of the housing 10. The bottom of the inner annular channel 13a is connected through draining outlets 14b formed in the wall of the housing 10 to tubes 14a positioned inside the housing 10. The tubes 14a are directed away from the reflector 1 and toward the bottom of the housing 10. An outer annular channel 13b is formed in the bearing surface of the slide piece 11. As shown in FIG. 3, the outer annular channel 13b surrounds an area of such length that, even with maximum displacement of the slide piece 11, the outer annular channel 13b continues to surround the inner annular channel 13a. The outer annular channel 13b is connected by an inlet 11a passing through the slide piece 11 to an elevated vacuum oil supply tank 14. Vacuum oil 14c flows from the supply tank 14 into the channel 13b which then distributes the oil 14c in the bearing gap 12. Two outermost parallel channels 13c are defined by the outer wall of the housing 10 along the outside of the area surrounded by the outer annular channel 13b. FIG. 3 shows clearly the layout of all of the channels 13a, 13b, 13c. Each parallel channel 13c is connected at one end to a tube 17a which in turn is connected to an oil collecting container 17.

By reason of this arrangement, vacuum oil 14c flows from the vacuum oil supply tank 14 through the outer annular channel 13b into the bearing gap 12 and there forms a substantially airtight seal between the slide piece 11 and the wall of the housing 10 around the slit 10a. Thus the interior of the housing 10 is sealed off from environmental influences. As it spreads through the bearing gap 12, the vacuum oil 14c is collected by the inner annular channel 13a and the outermost parallel channels 13c. Thus the oil 14c is prevented from leaking out and fouling other components, some of which may be oil-sensitive.

The oil 14c collected by the parallel channels 13c flows through tubes 17a into the collecting container 17. The oil 14c collected by the inner annular channel 13a flows through outlets 14b and tubes 14a to the bottom of the housing 10. From there it flows through a drain 15 connected to the bottom of the housing 10 to an airtight collecting tank 16. A vacuum pump 18 maintains an air vacuum in the tank 16. For this purpose a relatively low-capacity pump suffices. An oil pump 19 pumps the collected oil 14c from the collecting tank 16 back to the supply tank 14 so that the collected oil 14c may be recirculated through the apparatus.

Of course, it should be understood that various changes and modifications to the preferred embodiment described above will be apparent to those skilled in the art. For example, the friction-free bearing is not restricted to an air bearing, but may instead be any gas, liquid, or other suitable fluid bearing. In addition, the geometry of the channeling scheme may be varied to suit individual applications. Furthermore, the instrument may be inverted such that the housing is supported on the movable member. These and other changes can be made without departing from the spirit and the scope of the invention and without diminishing its attendant advantages. It is therefore intended that such changes and modifications be covered by the following claims.

I claim:

1. In an improved precision measuring apparatus defining a measuring interval sealed from environmental influences, the apparatus including a shielding housing surrounding the measuring interval and defining within the housing wall a slit oriented along the measuring interval, a movable member attachable to a measured object and movable along the measuring interval, and a carrying member attached to the movable member and extending through the slit, the improvement comprising:

fluid bearings interposed between the movable member and the shielding housing to form a bearing gap therebetween, the fluid bearings positioned to movably support the movable member on the shielding housing substantially without friction; and sealing fluid positioned in the bearing gap to seal the slit.

2. The apparatus of claim 1 further comprising means for evacuating the shielding housing.

3. The apparatus of claim 1 further comprising sealing fluid supply means positioned to supply sealing fluid to the bearing gap and wherein the movable member defines a channel positioned to distribute sealing fluid from the supply means through the bearing group.

4. The apparatus of claim 1 or 2 further comprising sealing fluid supply means positioned to supply sealing fluid to the bearing gap and wherein the movable member and the housing wall define channels positioned to control the distribution of sealing fluid from the supply means through the bearing gap.

5. The apparatus of claim 1 further comprising:
sealing fluid supply means positioned to supply sealing fluid to the bearing gap;
holding means for holding drained sealing fluid;
means for draining the shielding housing into the holding means;
vacuum means for evacuating the holding means; and
means for feeding the sealing fluid from the holding means to the supply means.

6. The apparatus of claim 3 further comprising holding means for holding drained sealing fluid;
means for draining the shielding housing into the holding means;
vacuum means for evacuating the holding means; and
means for feeding the sealing fluid from the holding means to the supply means.

7. The apparatus of claim 1 or 2 or 3 or 5 or 6 wherein the sealing fluid comprises a vacuum oil.

8. The apparatus of claim 4 wherein the sealing fluid comprises a vacuum oil.

9. The apparatus of claim 1 wherein the fluid bearings are pneumatic.

10. The apparatus of claim 9 further comprising means for feeding compressed air into the bearing gap.

11. An improved precision measuring apparatus defining a measuring interval sealed from environmental influences, the apparatus comprising:
a shielding housing surrounding the measuring interval, the housing defining within its wall a slit oriented along the measuring interval, the housing further defining within its outer wall an inner annular channel encircling the slit, the housing further defining within its outer wall at least one outermost channel encircling at least in part the inner annular channel;
a movable member attachable to a measured object and movable along the measuring interval, the movable member positioned over the housing, the movable member defining within its wall adjacent to the housing an outer annular channel, the inner and outer annular channels and the at least one outermost channel arranged such that the outer annular channel encircles the inner annular channel and the at least one outermost channel surrounds at least in part the outer annular channel;
a carrying member attached to the movable member, the carrying member extending through the slit;
means for introducing bearing fluid between the movable member and the shielding housing, the bearing fluid introducing means arranged to create a bearing gap between the movable member and the housing, the bearing fluid forming a bearing within the bearing gap, the bearing movably supporting the movable member on the housing substantially without friction;
means for supplying sealing fluid to the bearing gap, the inner annular channel arranged to distribute the sealing fluid through the bearing gap to form a seal around the slit, the outer annular channel and the at least one outermost channel arranged to collect the sealing fluid in the bearing gap;
means for draining sealing fluid from the at least one outermost channel;
means for draining sealing fluid from the inner annular channel into the housing; and
means for evacuating and draining the housing.

12. The apparatus of claim 11 wherein the bearing fluid is a gas and wherein the bearing fluid introducing means comprise a plurality of nozzles arranged on the movable member for feeding compressed gas into the bearing gap.

13. The apparatus of claim 11 wherein the sealing fluid supply means include means for recirculating the drained sealing fluid.

* * * * *